United States Patent
Chiang et al.

(10) Patent No.: US 11,892,884 B2
(45) Date of Patent: Feb. 6, 2024

(54) HINGE STRUCTURE

(71) Applicant: ASUSTEK COMPUTER INC., Pei Tou (TW)

(72) Inventors: Tsung-Ju Chiang, Pei Tou (TW); Marco Da Ros, Pei Tou (TW); Yung-Hsiang Chen, Pei Tou (TW); Li Wei Hung, Pei Tou (TW)

(73) Assignee: ASUSTEK COMPUTER INC., Taipei (TW)

( * ) Notice: Subject to any disclaimer, the term of this patent is extended or adjusted under 35 U.S.C. 154(b) by 173 days.

(21) Appl. No.: 17/333,468

(22) Filed: May 28, 2021

(65) Prior Publication Data
US 2022/0129045 A1 Apr. 28, 2022

(30) Foreign Application Priority Data
Oct. 23, 2020 (TW) .................................. 109136785

(51) Int. Cl.
*G06F 1/16* (2006.01)
(52) U.S. Cl.
CPC .......... *G06F 1/1681* (2013.01); *G06F 1/1679* (2013.01)
(58) Field of Classification Search
CPC .............. G06F 1/1681; G06F 1/1679; E05D 2011/1035; E05D 11/105; E05D 11/1078; E05D 11/1007; Y10T 16/540253; Y10T 16/54095
See application file for complete search history.

(56) References Cited

U.S. PATENT DOCUMENTS

| | | | | |
|---|---|---|---|---|
| 1,166,702 A | * | 1/1916 | Mardon et al. | E05D 11/1078 16/329 |
| 7,088,588 B2 | * | 8/2006 | Lee | G06F 1/1679 292/108 |
| 7,609,514 B2 | * | 10/2009 | Doczy | E05C 9/045 361/679.21 |

(Continued)

FOREIGN PATENT DOCUMENTS

| | | |
|---|---|---|
| CN | 102118937 A | 7/2011 |
| CN | 202381520 U | 8/2012 |

(Continued)

OTHER PUBLICATIONS

Office Action issued in corresponding TW application No. 109136785 dated Jul. 14, 2021 (10 pages).

*Primary Examiner* — Victor D Batson
*Assistant Examiner* — Matthew J Sullivan
(74) *Attorney, Agent, or Firm* — Muncy, Geissler, Olds & Lowe, P.C.

(57) ABSTRACT

A hinge structure for an electronic device including a first part and a second part is provided. The hinge structure includes a first fixing base, a second fixing base, a rotating element, and a control element. The first fixing base connects to the first part. The second fixing base connects to the second part and includes a first locking structure. The rotating element includes a second locking structure. An end of the rotating element rotatably and movably connects to the first fixing base along an axial direction. The other end of the rotating element engages with the first locking structure through the second locking structure. The control element extends to the rotating element for driving the rotating element to move along the axial direction.

4 Claims, 10 Drawing Sheets

(56) References Cited

U.S. PATENT DOCUMENTS

| | | | | |
|---|---|---|---|---|
| 8,154,868 B2* | 4/2012 | Xu | G06F 1/1616 | 248/920 |
| 8,584,320 B2* | 11/2013 | Lin | G06F 1/1681 | 248/292.12 |
| 8,644,013 B2* | 2/2014 | Chung | G06F 1/1681 | 16/392 |
| 8,707,521 B1* | 4/2014 | Mack | E05D 11/1078 | 16/326 |
| 8,797,765 B2* | 8/2014 | Lin | F16M 13/00 | 248/397 |
| 8,908,858 B2* | 12/2014 | Chiu | H05K 5/0217 | 379/455 |
| 8,941,991 B2* | 1/2015 | Guo | G06F 1/1667 | 361/679.2 |
| 8,971,025 B2* | 3/2015 | Nakada | G06F 1/1649 | 361/679.21 |
| 9,072,160 B2* | 6/2015 | Yuan | G06F 1/1632 | |
| 9,137,907 B2* | 9/2015 | Sun | H05K 5/0017 | |
| 9,137,923 B2* | 9/2015 | Oh | G06F 1/1624 | |
| 9,310,848 B2* | 4/2016 | Fujino | G06F 1/1681 | |
| 9,395,752 B2* | 7/2016 | Chen | G06F 1/1681 | |
| 9,483,083 B1* | 11/2016 | Zaloom | G06F 3/0208 | |
| 9,506,281 B1* | 11/2016 | Zaloom | G06F 1/166 | |
| 9,753,497 B2* | 9/2017 | Tian | G06F 1/1626 | |
| 9,933,009 B1* | 4/2018 | Zaloom | F16M 11/10 | |
| 10,185,369 B1* | 1/2019 | Yu | G06F 1/1616 | |
| 10,253,536 B1* | 4/2019 | Zaloom | G06F 1/166 | |
| 10,329,814 B1* | 6/2019 | Tamer | E05D 11/1007 | |
| 10,534,407 B2* | 1/2020 | Alva | F16D 1/10 | |
| 10,772,224 B2* | 9/2020 | Lan | G06F 1/1616 | |
| 10,802,548 B2* | 10/2020 | Wu | G06F 1/1607 | |
| 11,733,738 B2* | 8/2023 | Nawata | H01M 50/247 | 361/679.55 |
| 2007/0120372 A1* | 5/2007 | Zhang | G06F 1/1616 | 292/8 |
| 2008/0184529 A1* | 8/2008 | Thom | G06F 1/1616 | 16/337 |
| 2010/0321882 A1* | 12/2010 | Tracy | G06F 1/1681 | 361/679.55 |
| 2014/0259532 A1* | 9/2014 | Millard | E05D 11/1028 | 16/326 |
| 2017/0122018 A1* | 5/2017 | Huang | E05D 5/06 | |
| 2022/0129044 A1* | 4/2022 | Chiang | G06F 1/1681 | |
| 2022/0413555 A1* | 12/2022 | Ma | G06F 1/1681 | |
| 2023/0205279 A1* | 6/2023 | Bae | G06F 1/1679 | 361/679.57 |
| 2023/0280804 A1* | 9/2023 | Chung | G06F 1/1616 | 361/679.27 |

FOREIGN PATENT DOCUMENTS

| | | |
|---|---|---|
| CN | 202402467 U | 8/2012 |
| CN | 103486414 B | 1/2016 |
| CN | 206249153 U | 6/2017 |
| TW | 201330039 A | 7/2013 |

* cited by examiner

HINGE STRUCTURE

CROSS-REFERENCE TO RELATED APPLICATION

This application claims the priority benefit of Taiwan application serial No. 109136785, filed on Oct. 23, 2020. The entirety of the above-mentioned patent application is hereby incorporated by reference herein and made a part of the specification.

BACKGROUND OF THE INVENTION

Field of the Invention

The disclosure relates to a hinge structure, and in particular, to a hinge structure for an electronic device.

Description of the Related Art

A hinge structure of a notebook computer is usually equipped with a torque hinge to enable a screen retained in a required angle. However, as the characteristic of a torque hinge, enough force has to be applied while opening or closing a screen of a conventional notebook computer. Particularly, when opening the screen, a user usually needs to hold the computer host and the screen at the same time and applies forces appropriately to open the screen.

BRIEF SUMMARY OF THE INVENTION

The disclosure provides a hinge structure for an electronic device. The electronic device includes a first part and a second part. The hinge structure includes a first fixing base, a second fixing base, a rotating element, and a control element. The first fixing base connects to the first part. The second fixing base connects to the second part and includes a first locking structure.

The rotating element includes a second locking structure. An end of the rotating element rotatably and movably connects to the first fixing base along an axial direction. The other end of the rotating element engages with the first locking structure through the second locking structure. The control element extends to the rotating element for driving the rotating element to move along the axial direction.

The disclosure provides an electronic device, including a first part, a second part, the foregoing hinge structure, and a third part. The third part includes a groove, a sliding element, and a positioning element. The groove is located on a side of the third part facing the second part. The sliding element pivotally connects to the second part. The sliding element is movably disposed in the groove along a first direction, and includes a third locking structure. The positioning element is movably disposed in the groove along a second direction, and includes a fourth locking structure, configured to engage with the third locking structure.

By using the hinge structure provided in the disclosure, a user only needs to press the control element, so that an engagement mechanism between the rotating element and the second fixing base is released. In this case, the user arbitrarily rotates the second part. When rotating the second part to a required angle, the user only needs to release the control element, so that the rotating element engages with the second fixing base, to retain an inclined angle between the second part and a first part. Therefore, in addition to facilitating the user to retain a screen of an electronic device in a required angle, the user also easily opens and closes the electronic device.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1A:
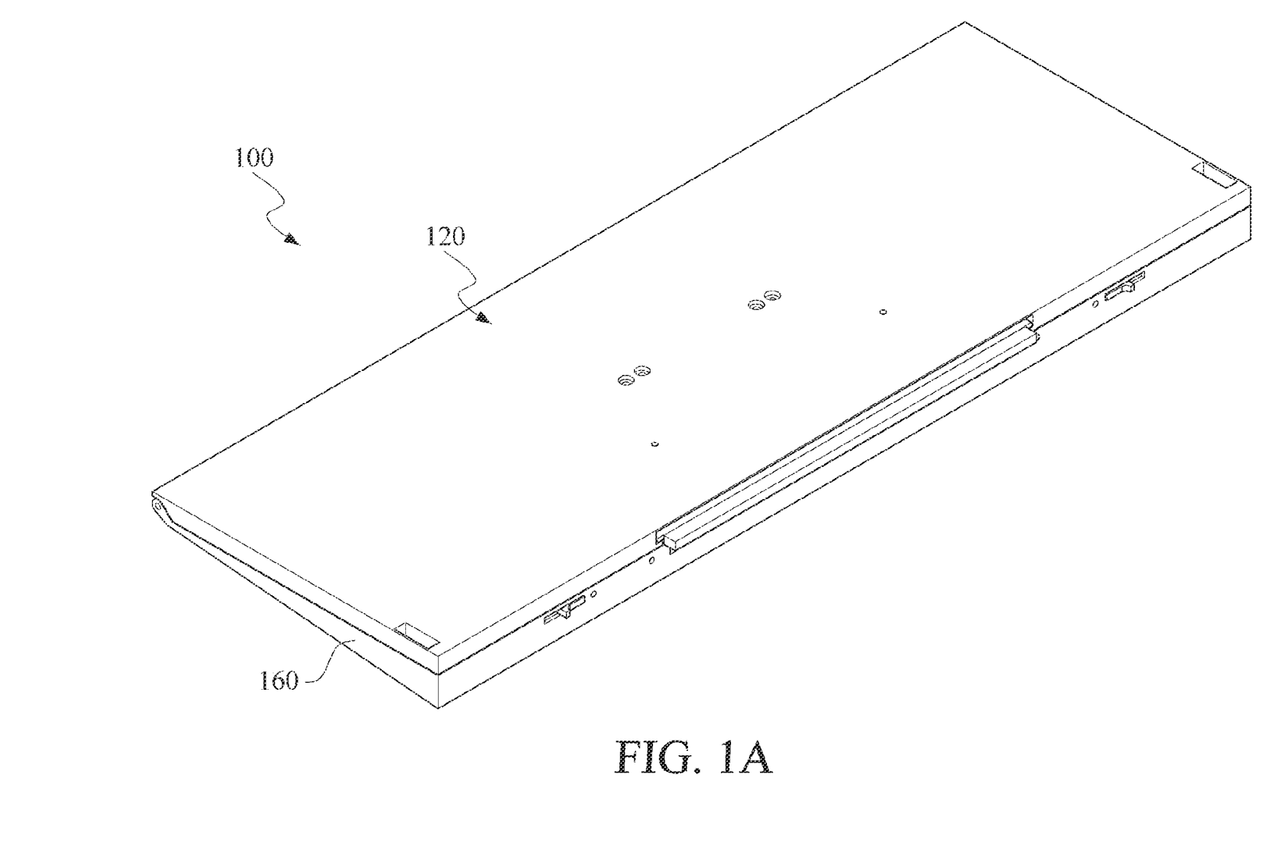
FIG. 1A and FIG. 1B are schematic three-dimensional diagrams of an opening state and a closing state of an electronic device according to an embodiment of the disclosure.
Figure 1B:
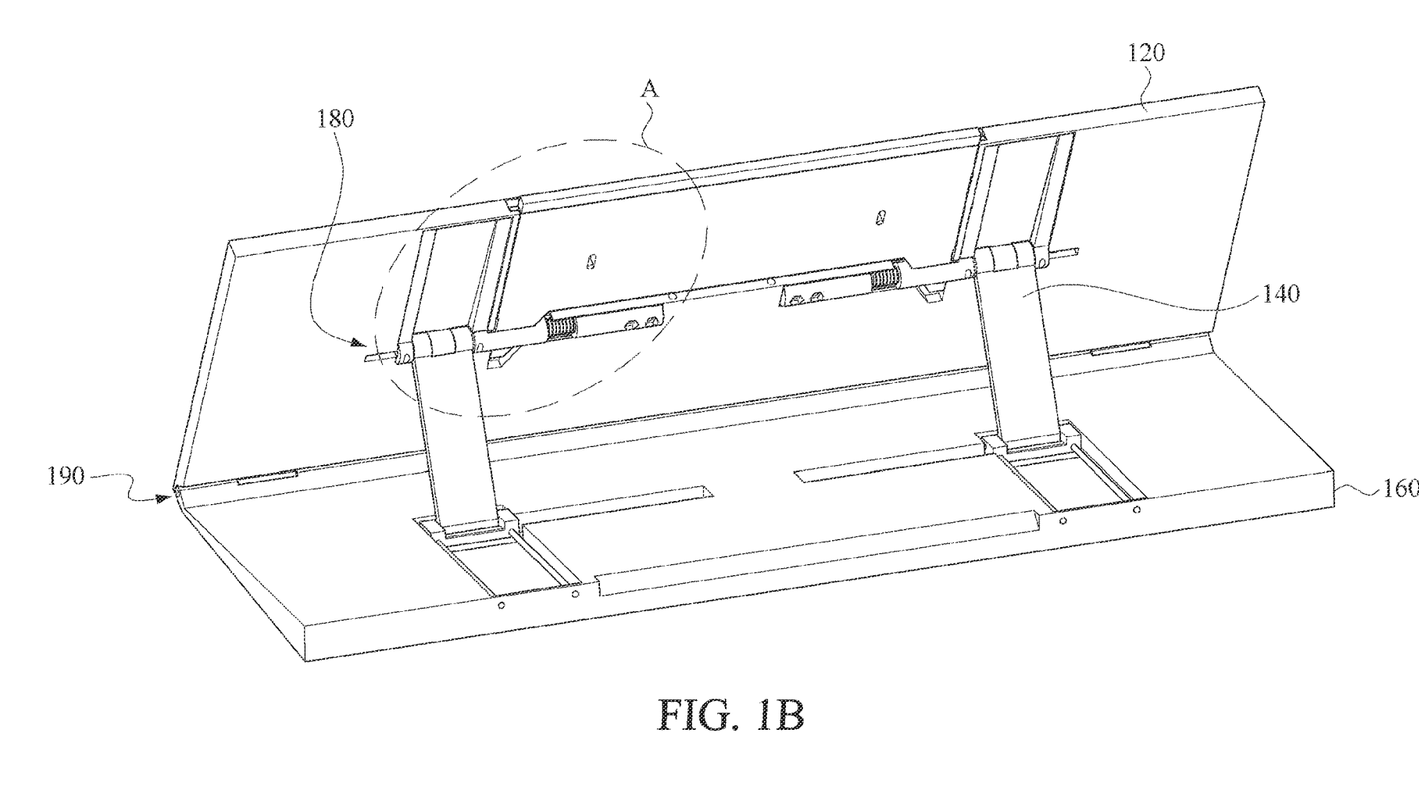

Referring to FIG. 1A and FIG. 1B, FIG. 1A and FIG. 1B are respectively schematic three-dimensional diagrams of an opening state and a closing state of an electronic device according to an embodiment of the disclosure. As shown in the figures, an electronic device 100 includes a first part 120, two second parts 140, a third part 160, and two hinge structures 180. In an embodiment, the first part 120 is a screen portion of the electronic device 100, the second parts 140 are supporting frames disposed at a rear surface of the screen, and the third part 160 is considered as a base of the electronic device 100.

The first part 120 pivotally connects to the third part 160 through a pivot structure 190. The hinge structures 180 are disposed in a middle position at the rear surface of the first part 120 (that is, a surface of the screen portion facing the base). An end of each of the second parts 140 connects to the corresponding hinge structure 180, and the other end movably connects to the third part 160.

By changing inclined angles of the second parts 140 (that is, the supporting frames) relative to the first part 120 (that is, the screen portion), an inclination angle of the first part 120 (that is, the screen portion) relative to the third part 160

(that is, the base) is changed. By limiting rotation of the hinge structures 180, the first part 120 is retained at a required inclination angle.

Figure 2:
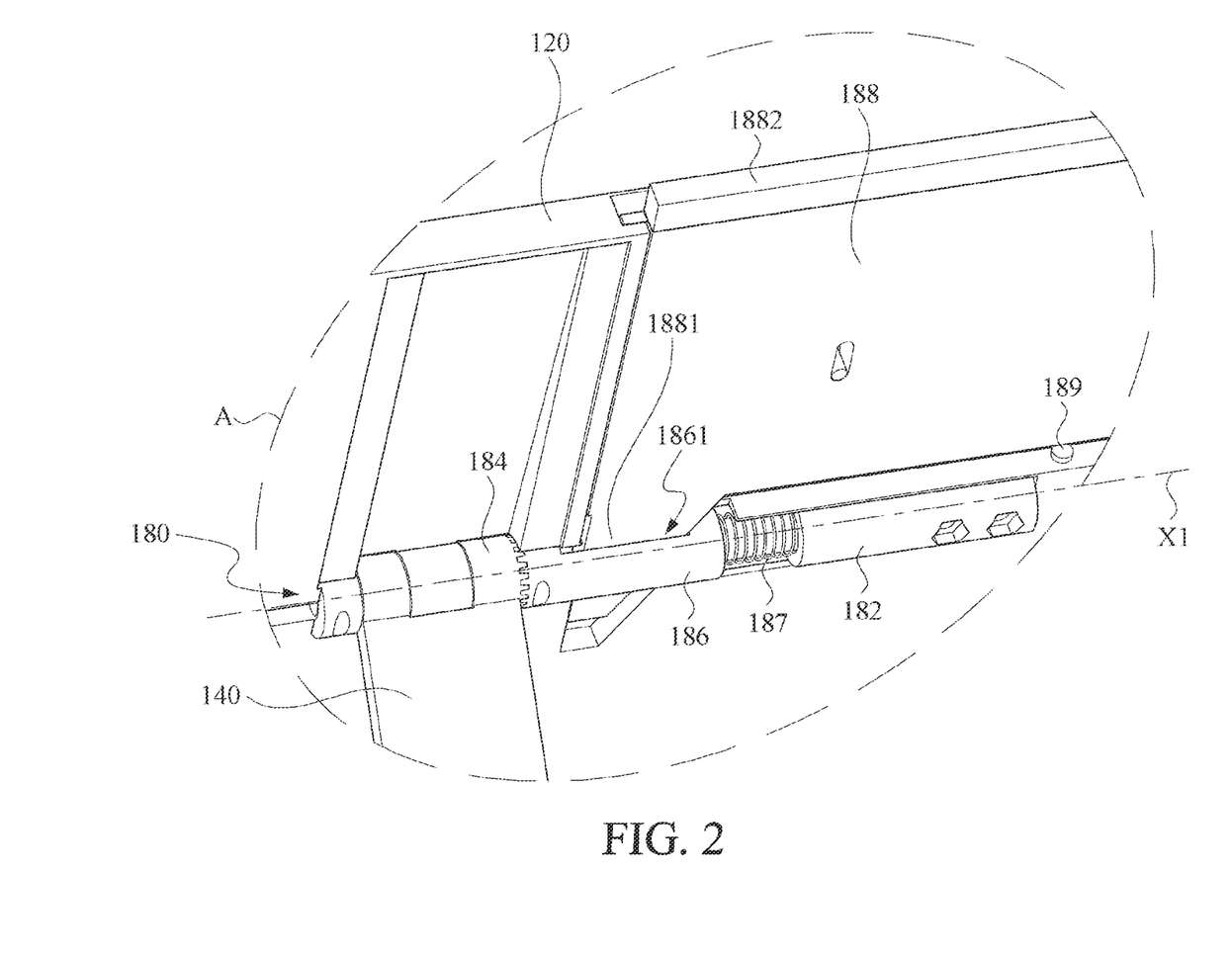
FIG. 2 enlarges the display of a hinge structure of FIG. 1B.

Referring to FIG. 2 together, FIG. 2 enlarges the display of a hinge structure of FIG. 1B. As shown in the figure, the hinge structure 180 includes a first fixing base 182, a second fixing base 184, a rotating element 186, and a control element 188. The first fixing base 182 connects to the first part 120. The second fixing base 184 connects to the second part 140.

An end of the rotating element 186 rotatably and movably connects to the first fixing base 182 along an axial direction X1. The other end of the rotating element 186 is configured to engage with the second fixing base 184, and further to retain the second part 140 to a required inclination position.

In an embodiment, the rotating element 186 includes an opening 1861. The control element 188 includes an extended portion 1881, and the extended portion 1881 extends into the opening 1861, to drive the rotating element 186 to move along the axial direction X1.

Figure 3:
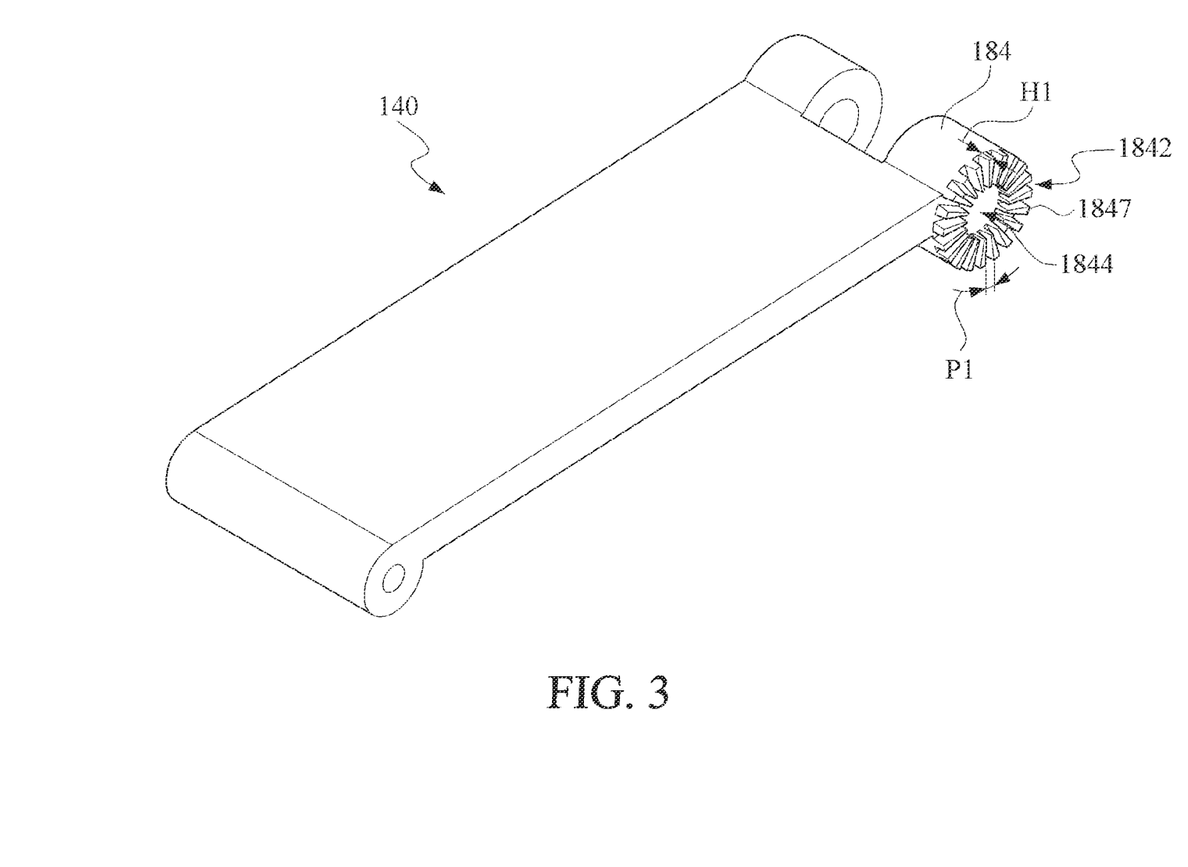
FIG. 3 is a schematic three-dimensional diagram of an embodiment of a second fixing base according to the disclosure.
Figure 4:
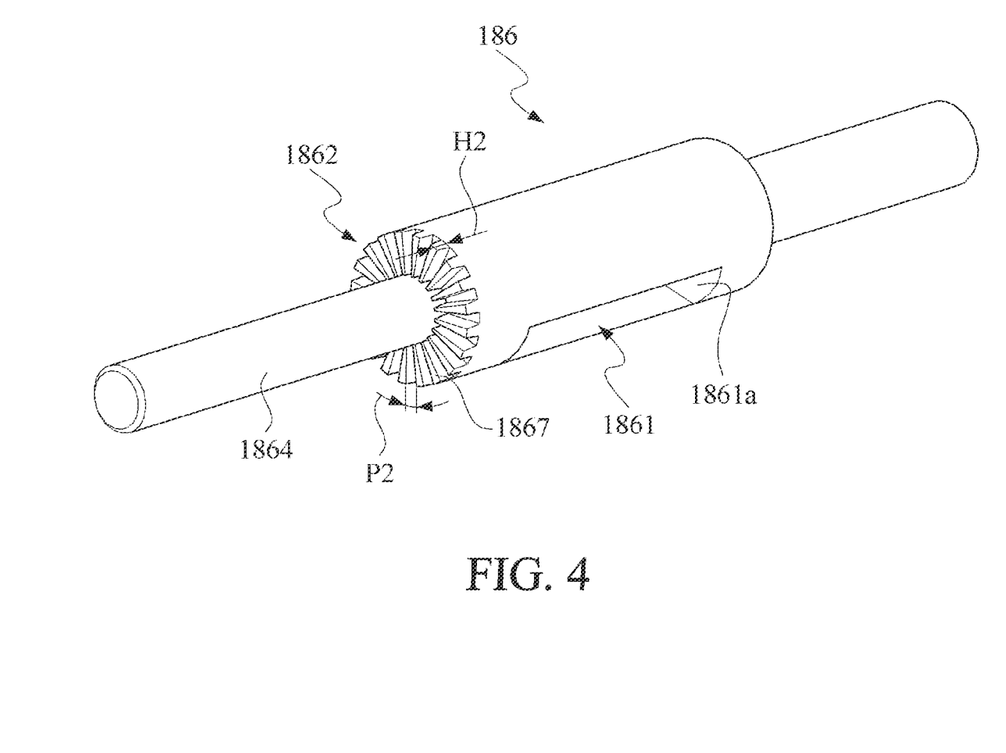
FIG. 4 is a schematic three-dimensional diagram of an embodiment of a rotating element according to the disclosure.

Subsequent paragraphs describe more detail corresponding to FIG. 3 and FIG. 4 for an engagement structure between the second fixing base 184 and the rotating element 186. Subsequent paragraphs describe more detail corresponding to FIG. 5 for details of the control element 188 that driving the rotating element 186 to move.

In an embodiment, the hinge structure 180 further includes a first elastic element 187. The first elastic element 187 is disposed between the rotating element 186 and the first fixing base 182. In an embodiment, the first elastic element 187 is a compression spring, configured to push the rotating element 186 towards a direction of the second fixing base 184, so that the rotating element 186 engages with the second fixing base 184.

In an embodiment, the hinge structure 180 further includes a second elastic element 189. The second elastic element 189 is disposed between the control element 188 and the first fixing base 182. In an embodiment, the second elastic element 189 is a compression spring, configured to push the control element 188 towards a direction away from the rotating element 186.

FIG. 3 is a schematic three-dimensional diagram of an embodiment of a second fixing base according to the disclosure, and FIG. 4 is a schematic three-dimensional diagram of an embodiment of a rotating element according to the disclosure.

In an embodiment, as shown in the figure, the second fixing base 184 is directly formed on an end of the second part 140. The second fixing base 184 includes a first locking structure 1842 and an opening 1844. The first locking structure 1842 is located on an end of the second fixing base 184 facing the rotating element 186. The opening 1844 is located at a center of the first locking structure 1842.

The rotating element 186 includes a second locking structure 1862 and a cylindrical projection 1864. The second locking structure 1862 is located on an end of the rotating element 186 facing the second fixing base 184. The cylindrical projection 1864 is located at a center of the second locking structure 1862, and is configured to extend into the opening 1844 of the second fixing base 184, to enable the rotating element 186 to pivotally connect to the second fixing base 184.

The second locking structure 1862 corresponds to the first locking structure 1842. By using an engagement mechanism between the first locking structure 1842 and the second locking structure 1862, rotation of the rotating element 186 relative to the second fixing base 184 is limited.

In an embodiment, as shown in the figure, the first locking structure 1842 includes a plurality of first tooth structures 1847 surrounding the opening 1844. The second locking structure 1862 includes a plurality of second tooth structures 1867 surrounding the cylindrical projection 1864.

That is, the first tooth structures 1847 and the second tooth structures 1867 are disposed surrounding a pivot structure between the rotating element 186 and the second fixing base 184. A quantity, a tooth pitch P1, and a tooth depth H1 of the first tooth structures 1847 of the first locking structure 1842 correspond to a quantity, a tooth pitch P2, and a tooth depth H2 of the second tooth structures 1867 of the second locking structure 1862.

In an embodiment, all of the tooth quantity, the tooth pitch P1, and the tooth depth H1 of the first tooth structures 1847 of the first locking structure 1842 are the same as the tooth quantity, the tooth pitch P2, and the tooth depth H2 of the second tooth structures 1867 of the second locking structure 1862.

The first tooth structures 1847 are symmetrically distributed around the opening 1844 by using the opening 1844 as a center, and the second tooth structures 1867 are symmetrically distributed around the cylindrical projection 1864 by using the cylindrical projection 1864 as a center. When the first tooth structures 1847 engages with the second tooth structures 1867, rotation of the rotating element 186 relative to the second fixing base 184 is limited.

Figure 5:
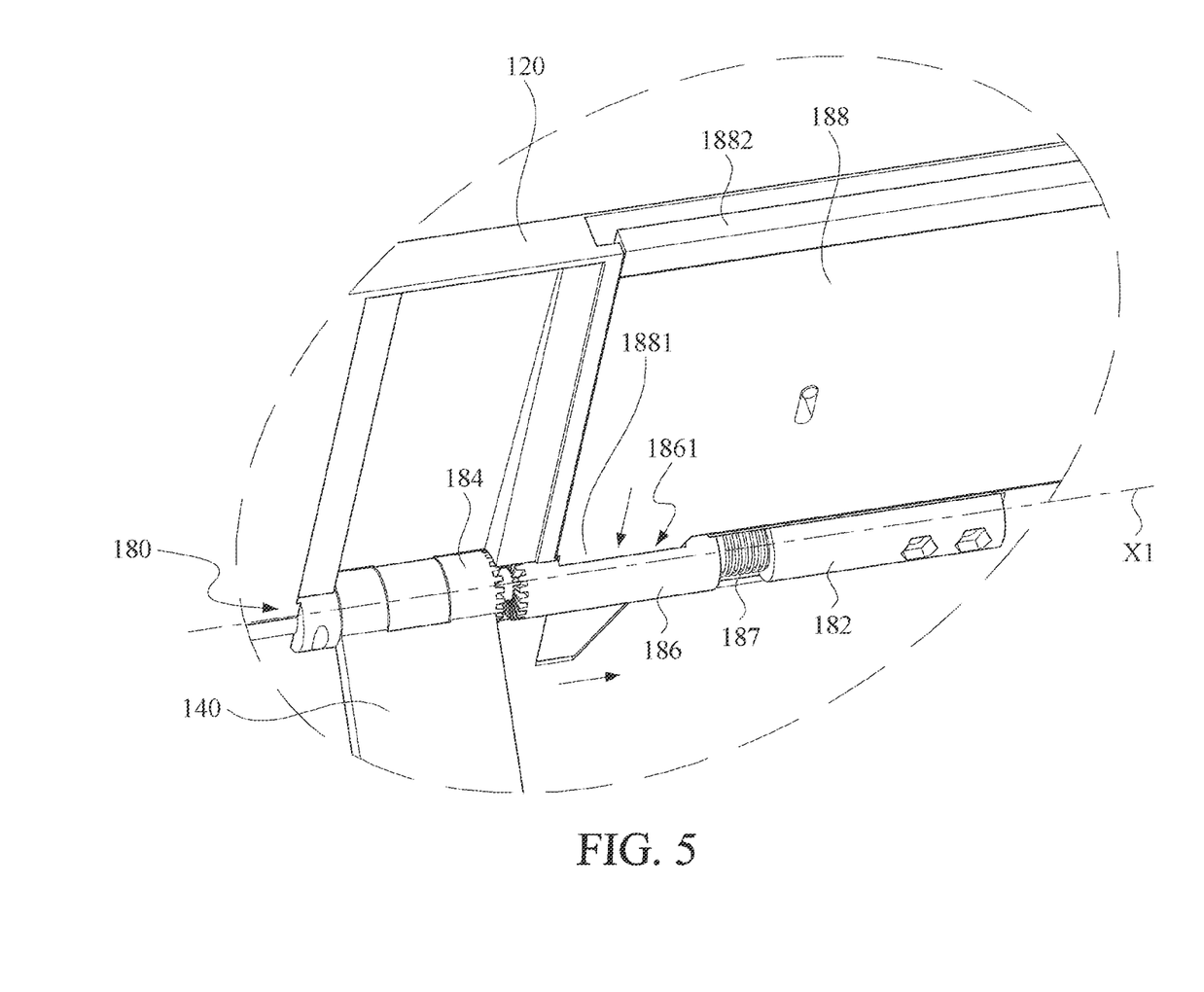
FIG. 5 shows an embodiment that an engagement mechanism between a rotating element and a second fixing base is released by pressing a control element according to the disclosure.

With reference to the rotating element 186 shown in FIG. 4, refer to FIG. 2 and FIG. 5 together. The rotating element 186 shown in FIG. 2 engages with the second fixing base 184, to retain the second part 140 at a required inclination position. FIG. 5 shows an embodiment that an engagement mechanism between the rotating element 186 and the second fixing base 184 is released by pressing the control element 180 according to the disclosure.

As shown in the figure, the rotating element 186 includes an opening 1861 along a direction perpendicular to the axial direction X1. In an embodiment, as shown in the figure, the opening 1861 is elongated, and a long side of the opening 1861 is parallel to the axial direction X1 of the rotating element 186, to match a shape of the control element 188. The opening 1861 is also provided with a bevel 1861a therein.

The control element 188 includes an extended portion 1881 and a pressing portion 1882. The extended portion 1881 extends into the opening 1861 of the rotating element 186, to press against the bevel 1861a to drive the rotating element 186 to move along the axial direction X1. The pressing portion 1882 extends beyond a machine body for a user to perform a pressing operation.

When the user pushes the control element 188 towards a direction of the rotating element 186, the extended portion 1881 of the control element 188 pushes the bevel 1861a in the opening 1861. In this case, a movable direction of the rotating element 186 is limited by the second fixing base 184, so that the rotating element 186 only moves along the axial direction X1.

The extended portion 1881 pushes the bevel 1861a by the rotating element 186 moves in a direction away from the second fixing base 184 along the axial direction X1, so that the second locking structure 1862 is separated from the first locking structure 1842.

In an embodiment, a distance that the control element 188 drives the rotating element 186 to move along the axial direction X1 is greater than the tooth depth H1 of the first tooth structures 1847 or the tooth depth H2 of the second tooth structures 1867. After the second locking structure 1862 is separated from the first locking structure 1842, the rotating element 186 rotates arbitrarily, and is not limited by the second fixing base 184.

In the foregoing moving process of the control element 188 and the rotating element 186, the first elastic element 187 and the second elastic element 189 are compressed and deformed under forces. When the force applied to the control element 188 eliminate, an elastic restoring force of the first elastic element 187 pushes the rotating element 186 to move in a direction facing the second fixing base 184, so that the rotating element 186 engages with the second fixing base 184 again.

Meanwhile, an elastic restoring force of the second elastic element 189 pushes the control element 188 to move in a direction away from the rotating element 186, so that the control element 188 is restored to an original position.

Two elastic elements, that is, the first elastic element 187 and the second elastic element 189, are used together in this embodiment, so that the control element 188 and the rotating element 186 are restored to original positions respectively.

In an embodiment, the second elastic element 189 is also omitted, and the control element 188 is driven to move to the original position of the control element by directly using the elastic restoring force provided by the first elastic element 187 through the rotating element 186.

In the embodiments of FIG. 1A and FIG. 1B, the hinge structures 180 are disposed in a middle position at the rear surface of the first part 120 (the screen portion) and are connected to an end of each of the second parts 140 (the supporting frames), the other end of each of the second parts 140 is movably connected to the third part 160 (that is, the base portion), and the first part 120 and the third part 160 are pivotally connected through another pivot structure 190.

In another embodiment, the hinge structures 180 in the disclosure are also disposed in other positions. For example, the hinge structures 180 are disposed in a middle position of a surface of the base facing the screen, or the hinge structures 180 serve as a pivot structure between the screen and the base.

Figure 6A:
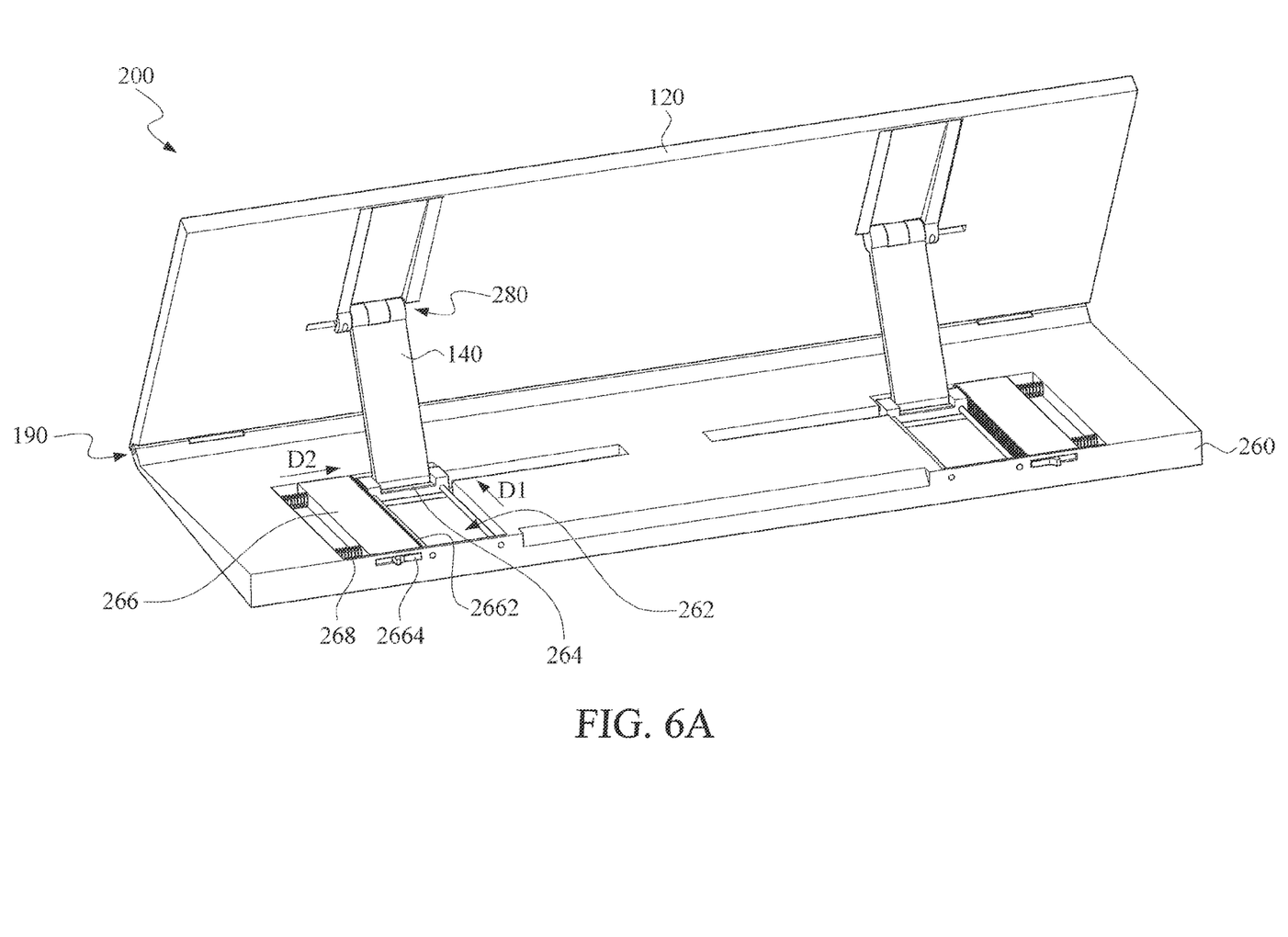
FIG. 6A and FIG. 6B are schematic three-dimensional diagrams of an opening state and a closing state of an electronic device according to another embodiment of the disclosure.
Figure 6B:
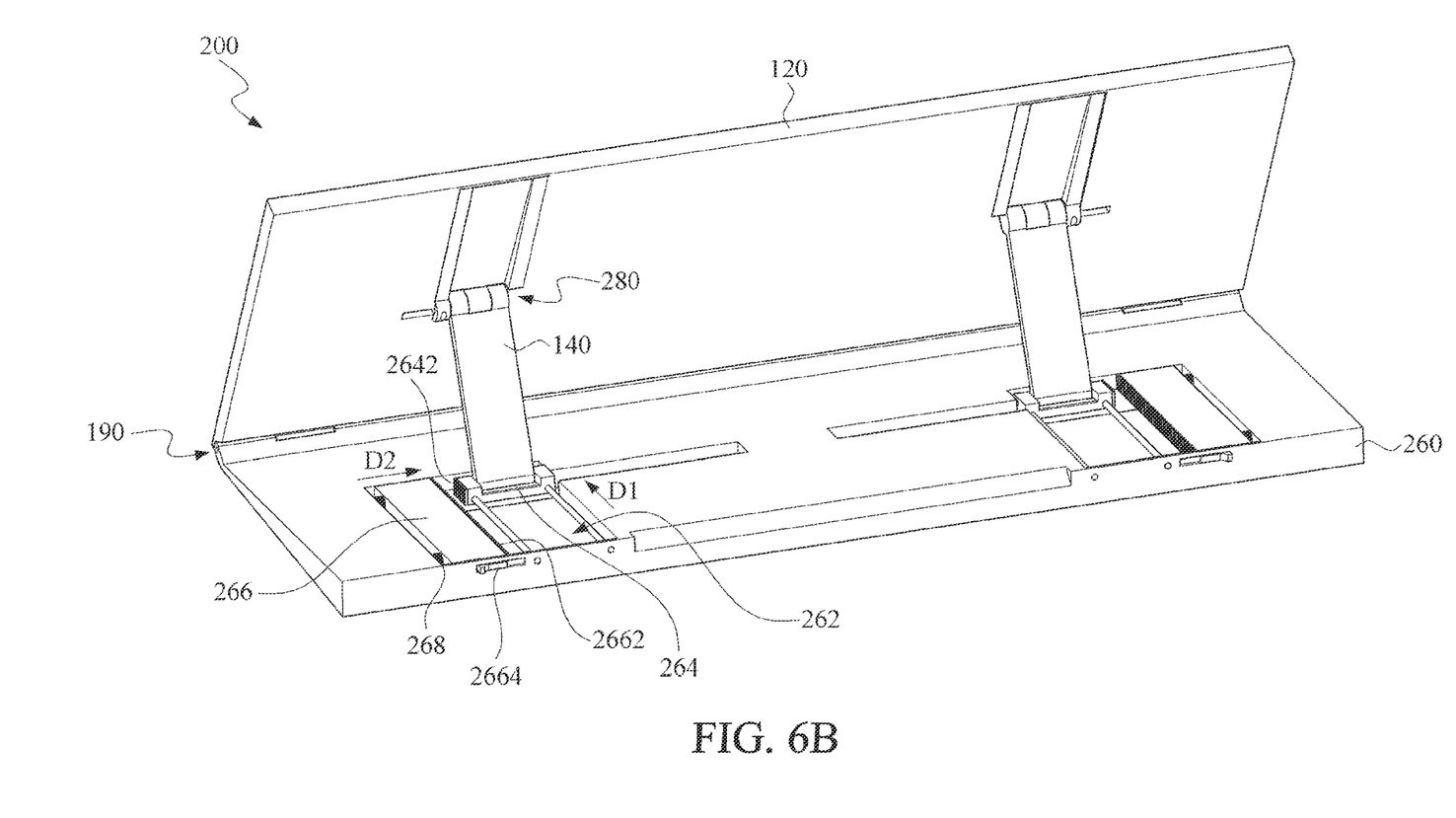

FIG. 6A and FIG. 6B are schematic three-dimensional diagrams of an opening state and a closing state of an electronic device according to another embodiment of the disclosure. Compared with the embodiments of FIG. 1A and FIG. 1B that the inclination angle of the first part 120 is retained by limiting the rotation of the hinge structure 180, in this embodiment, positions of second parts 140 are fixed by using positioning elements 266 on a third part 260, to further retain an inclination angle of a first part 120.

Other elements in this embodiment, for example, the first part 120, the second parts 140, and a pivot structure 190 are the same as those in the embodiments of FIG. 1A and FIG. 1B. Details are not described herein.

As shown in the figure, matching two second parts 140, the third part 260 includes two grooves 262, two sliding elements 264, and two positioning elements 266. The grooves 262 are located on a side of the third part 260 facing the second parts 140. The sliding elements 264 are movably disposed in the grooves 262 along a first direction D1. The positioning elements 266 are movably disposed in the grooves 262 along a second direction D2. The first direction D1 is perpendicular to the second direction D2.

An end of the second part 140 connects to a hinge structure 280, and the other end of the second part pivotally connects to the sliding element 264. In an embodiment, the hinge structure 280 is a general torque hinge or a torsionless hinge. In an embodiment, the hinge structure 280 is alternatively the hinge structure 180 shown in FIG. 2 of the disclosure.

In an embodiment, a third locking structure 2642 is disposed on a side of the sliding element 264 facing the positioning element 266. A fourth locking structure 2662 is disposed on a side of the positioning element 266 facing the sliding element 264. When the third locking structure 2642 engages with the fourth locking structure 2662, a connection position between the second part 140 and the third part 260 is fixed, to further retain the inclination angle of the first part 120.

In an embodiment, at least one third elastic element 268 is between the positioning element 266 and a side wall of the groove 262, to push the positioning element 266 towards a direction of the sliding element 264. In an embodiment, the third elastic element is a compression spring.

In an embodiment, the positioning element 266 further includes a button portion 2664. The button portion 2664 extends beyond the third part 260 for a user to operate.

As shown in the figure, when a user needs to change the inclination angle of the first part 120, the user pushes the positioning element 266 away from the sliding element 264 through the button portion 2664, so that the fourth locking structure 2662 on the positioning element 266 is separated from the third locking structure 2642 on the sliding element 264.

Until angle adjustment is completed, the user only needs to release the button portion 2664, an elastic restoring force provided by the third elastic element 268 automatically pushes the positioning element 266 towards the sliding element 264, so that the third locking structure 2642 engages with the fourth locking structure 2662 again, to fix the connection position between the second part 140 and the third part 260.

Figure 7A:
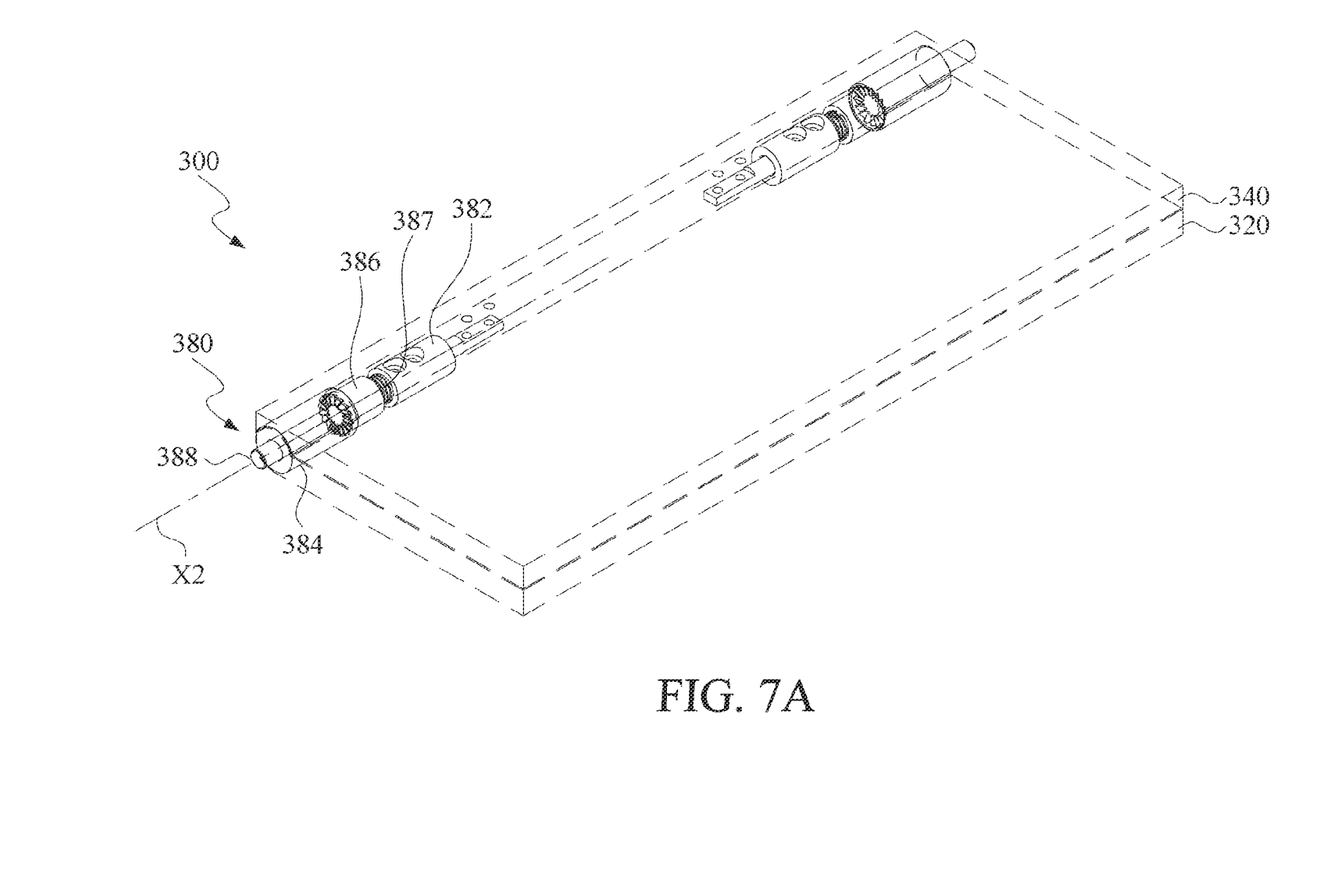
FIG. 7A and FIG. 7B are schematic three-dimensional diagrams of an opening state and a closing state of an electronic device according to still another embodiment of the disclosure.
Figure 7B:
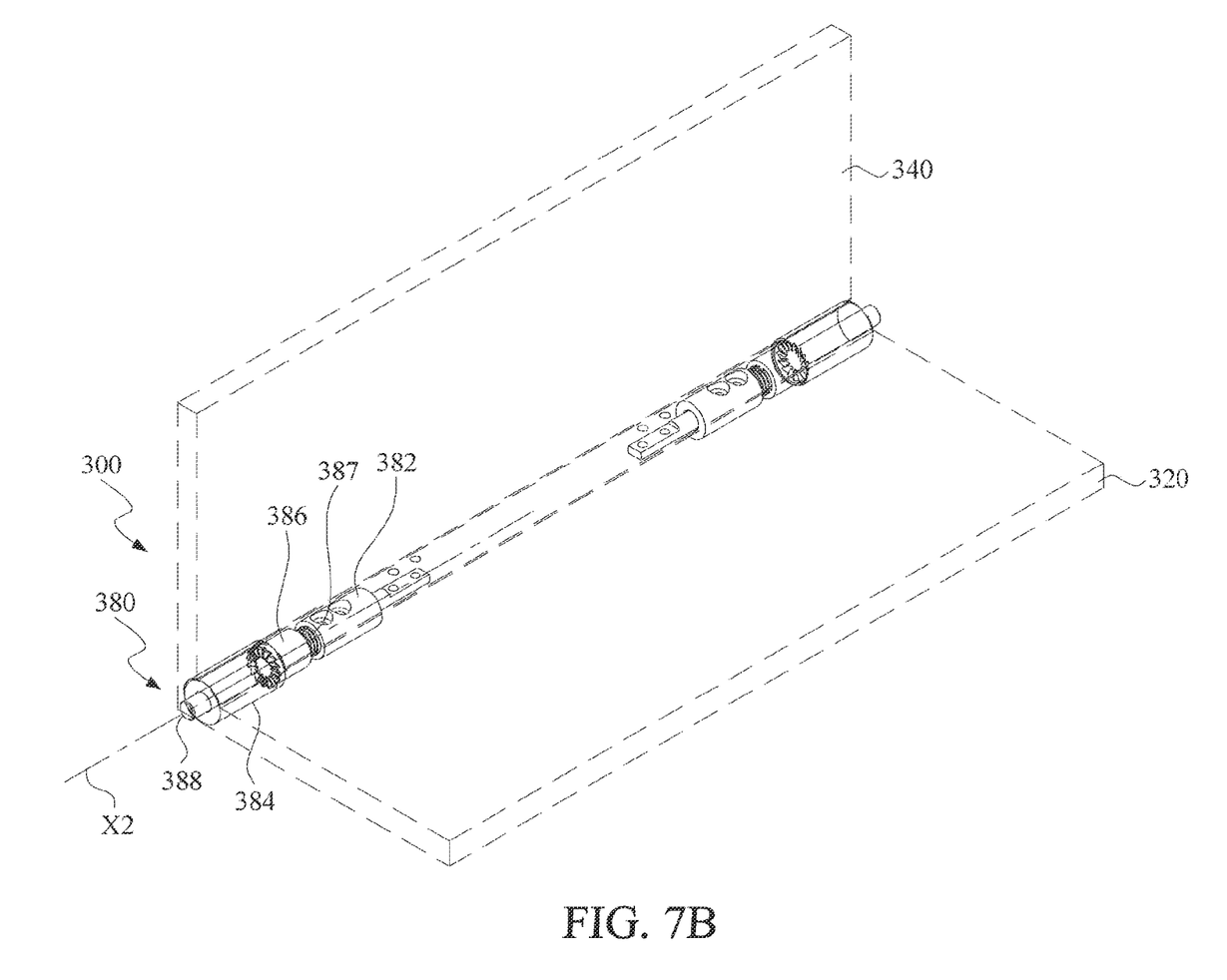

FIG. 7A and FIG. 7B are schematic three-dimensional diagrams of an opening state and a closing state of an electronic device according to another embodiment of the disclosure. As shown in the figures, an electronic device 300 in this embodiment includes a first part 320, a second part 340, and two hinge structures 380. The two hinge structures 380 are configured to pivotally connect the second part 340 to the first part 320. In an embodiment, the electronic device 300 is a notebook computer, the first part 320 is a host portion of the notebook computer, and the second part 340 is a screen portion of the notebook computer.

Each of the hinge structures 380 includes a first fixing base 382, a second fixing base 384, a rotating element 386, and a control element 388. The first fixing base 382 connects to the first part 320. The second fixing base 384 connects to the second part 340. An end of the rotating element 386 rotatably and movably connects to the first fixing base 382 along an axial direction X2. The other end of the rotating element 386 is configured to engage with the second fixing base 384, to retain the second part 340 to a required inclination position.

In addition, a first elastic element 387 between the rotating element 386 and the first fixing base 382 is configured to push the rotating element 386 towards a direction of the second fixing base 384, and further to enable the rotating element 386 to engages with the second fixing base 384.

A connection relationship among the foregoing rotating element 386, the first fixing base 382, the second fixing base 384, and the first elastic element 387 is similar to that in the embodiments of FIG. 1A and FIG. 1B. Details are not described herein.

A main difference between the hinge structure in this embodiment and the hinge structure in the embodiments of FIG. 1A and FIG. 1B lies in a structure of the control element 388 and a manner of connecting the control element 388 to the rotating element 386. As shown in the figure, different from the embodiments of FIG. 1A and FIG. 1B that a moving direction of the control element 188 is roughly perpendicular to the axial direction X1 of the rotating element 186, in this embodiment, a moving direction of the control element 388 is parallel to the axial direction X2 of the rotating element 386.

In an embodiment, as shown in the figure, the control element 388 in this embodiment penetrates the second fixing base 384 from the outside of the hinge structure 380 and extends to the rotating element 386, to drive the rotating element 386 to move along the axial direction X2.

In an embodiment, as shown in the figure, the control element 388 and the rotating element 386 are integrally formed. A user presses the control element 388 along the axial direction X2, so that the rotating element 386 moves in a direction towards the first fixing base 382. An elastic restoring force of the first elastic element 387 pushes the control element 388 to be restored to an original position (that is, a position shown in FIG. 7A).

By using the hinge structures 180 and 380 provided in the disclosure, a user only needs to press the control elements 188 and 388, so that engagement mechanisms between the rotating elements 186 and the second fixing bases 184, and between the rotating elements 386 and the second fixing bases 384 are released.

In this case, the user arbitrarily rotates the second parts 140 and 340. When rotating the second parts 140 and 340 to required angles, the user only needs to release the control elements 188 and 388, so that the rotating elements 186 and 386 respectively engage with the second fixing bases 184 and 384, to retain inclination angles of the second parts 140 and 340 relative to the first parts 120 and 320. Therefore, in addition to facilitating the user to retain a screen of an electronic device to a required angle position, the user also easily opens and closes the electronic device.

The above is merely preferred embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An electronic device, comprising:
a first part;
a second part; a hinge structure, comprising:
   a first fixing base, connected to the first part;
   a second fixing base, connected to the second part, and comprising a first locking structure; and a rotating element, comprising a second locking structure, wherein an end of the rotating element rotatably and movably connects to the first fixing base along an axial direction, and another end of the rotating element engages with the first locking structure through the second locking structure; and
a third part, comprising:
   a groove, located on a side of the third part facing the second part; and
   a sliding element, pivotally connected to the second part, disposed in the groove along a first direction, and comprising a third locking structure; and a positioning element, movably disposed in the groove along a second direction, and comprising a fourth locking structure configured to engage with the third locking structure.

2. The electronic device according to claim 1, further comprising an elastic element disposed between the positioning element and a side wall of the groove to push the positioning element in a direction towards the sliding element.

3. The electronic device according to claim 1, wherein the sliding element includes a third locking structure, and the third part includes a positioning element, movably disposed in the groove along a second direction, and comprising a fourth locking structure configured to engage with the third locking structure.

4. The electronic device according to claim 1, wherein the hinge structure includes a control element extended to the rotating element for driving the rotating element to move along the axial direction.

* * * * *